Jan. 14, 1958  E. L. STEWART ET AL  2,819,542
CUTTER HEAD FOR SUCTION DREDGES
Filed July 29, 1955
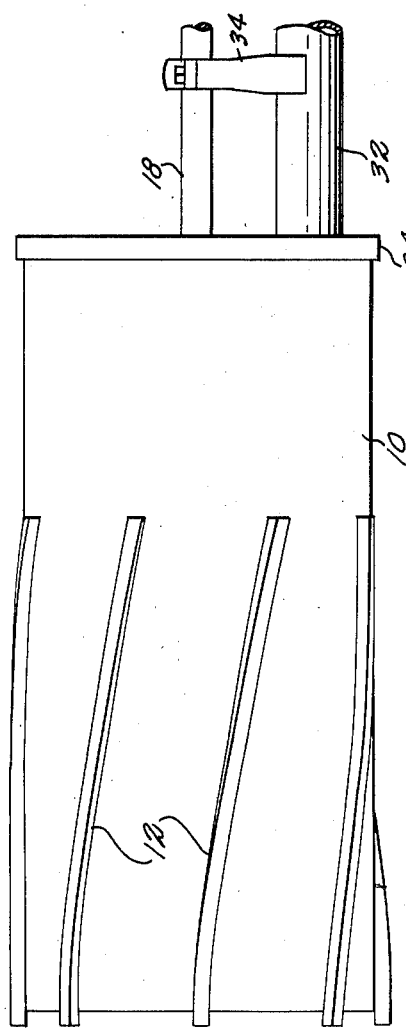
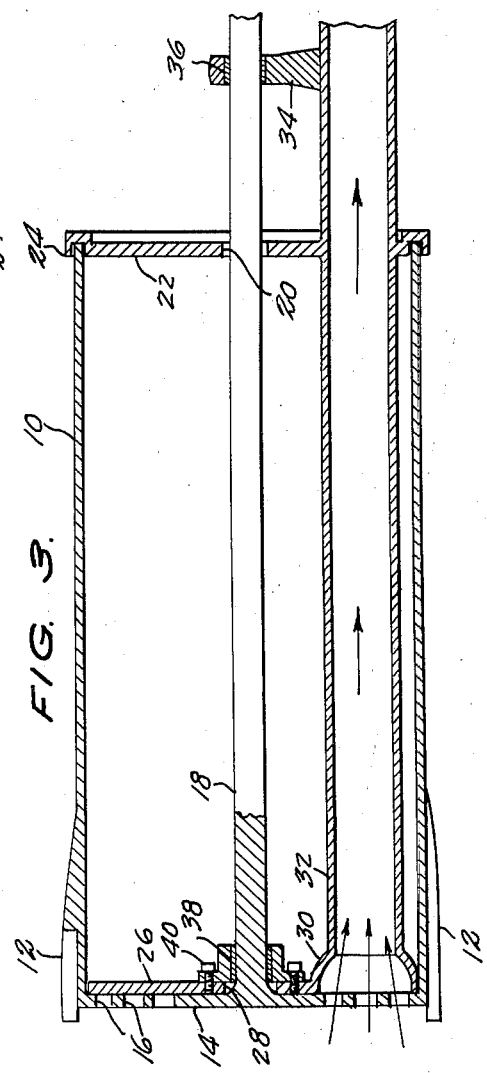
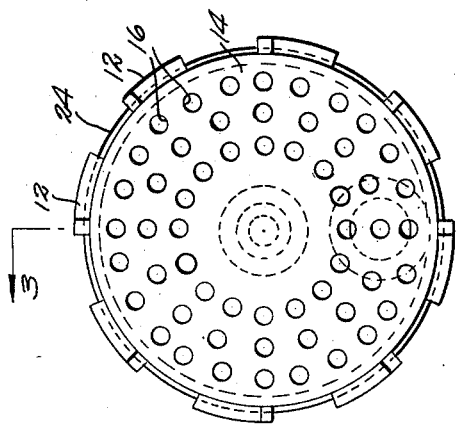
INVENTORS
EDWARD L. STEWART,
HENRY QUACKENBUSH,
ROYAL F. BREWTON,
BY
McMorrow, Berman + Davidson
ATTORNEYS.

27# United States Patent Office 2,819,542
Patented Jan. 14, 1958

2,819,542

CUTTER HEAD FOR SUCTION DREDGES

Edward L. Stewart, Royal Francis Brewton, and Henry Quackenbush, Mobile, Ala.

Application July 29, 1955, Serial No. 525,164

3 Claims. (Cl. 37—67)

This invention relates to a cutter head of a dredge, and more particularly has reference to a head designed especially for use on suction dredges, and having as its main object the prevention of clogging of the suction pump and pipe lines by debris such as stumps, poles, grass roots, rocks, and various settlings which may be found in the bed of the body of water that is being dredged.

A continuing problem in dredging operations arises from the fact that debris of the type mentioned above tends to hang up upon the cutting blade and suction line, in such a manner as the cause serious damage to the shaft or to the cutter head of the dredging assembly. The broad object of the present invention is to prevent occurrences of this type.

The device constituting the invention may be summarized briefly as comprising a cylinder having a perforated strainer plate connected to the head-rotating shaft so as to rotate at a selected speed; cutter blades on the rotating cylinder; and a suction line extending within the cylinder adjacent the periphery of said cylinder, but held against rotation relative to the cylinder, said suction line terminating in contact with the strainer plate for movement of the pumped liquid through the strainer plate into the suction line, with the strainer plate in turn being disposed at the forward extremity of the rotating cylinder, thus to allow the minimum of one inch between the bottom of the cut being made, and the straining unit and suction line. The advantage inherent in this arrangement is that no large object can move into the small area immediately in advance of the strainer plate, so that the strainer unit is not required to strain material having large objects therein, thus increasing, correspondingly, the overall efficiency of the cutter head.

Other objects will appear from the following description, the claims appended thereto, and from the annexed drawing, in which like reference characters designate like parts throughout the several views, and wherein:

Figure 1 is a front elevational view of a cutter head formed according to the present invention;

Figure 2 is a side elevational view thereof; and

Figure 3 is a longitudinal sectional view therethrough on line 3—3 of Figure 1.

The cutter head constituting the present invention includes an elongated, large diameter, hollow cylinder 10. Formed on the outer surface of the cylinder, and extending from a location slightly in advance of the forward extremity of the cylinder to a location between the midlength point and the rear end of the cylinder are a circumferential series of vertical ribs to provide cutter blades 12, uniformly spaced apart about the full circumference of the cylinder.

Integrally provided upon the front end of the cylinder is a strainer plate 14, and this is provided, as shown to particular advantage in Figure 1, with concentric, annular rows of perforations 16.

A shaft 18 extends axially of and within the cylinder, and is fixedly connected at one end to the strainer plate 14. The other end of the shaft extends through an opening 20 formed in a cover plate 22 for the rear end of the cylinder, the cover plate 22 having a peripheral flange 24 engaging over the adjacent end edge of the side wall of the cylinder.

Disposed in contact with the inner surface of the strainer plate 14 is a circular backing plate 26, the diameter of which corresponds substantially to the diameter of the cylinder. The backing plate 26 is formed with a center opening 28 through which the shaft 18 projects, and integral or otherwise rigidly secured to the backing plate, at the margin of said plate, is the belled end 30 of a suction line 32, extending longitudinally of and within the cylinder in parallelism with the shaft 18. The suction line 32 is rigid with and extends through the cover plate 22, and secured fixedly to the suction line and extending laterally therefrom is a bearing 34 having a bushing 36 within which shaft 18 is rotatable.

Shaft 18, adjacent the backing plate, is journalled in a bearing 38 connected by bolts 40 or equivalent elements to the backing plate 26, about the opening 28.

In use of the cutter head, the shaft 18 is rotated by any suitable means, in the regular manner, and causes rotation of the strainer plate 14 and hence of the cylinder 10 and cutting blades 12. The suction line is held against rotation relative to the cylinder, together with its associated cover plate 22 and bearings 34 and backing plate 26.

The cylinder is rotated at a selected speed, as for example approximately 40 revolutions a minute, and during the rotation of the cylinder, the majority of the openings 16 of the strainer plate will be closed by the backing plate, with only those openings 16 being open that are registered at the moment with belled end 30. The liquid being pumped is sucked through the latter openings, in the direction of the arrows shown in Figure 3, and passes through the suction line 32, carrying with it the material being dredged.

Meanwhile, rotation of the cylinder causes objects to be kept from entering the suction line. This is due to the fact that the rotating strainer plate stops said objects from entering the suction line, and, in cooperation with the cylinder and cutting blades, carries the objects away from the suction line. Further, as the head swings from side to side, said objects are scraped from the strainer plate by the river bottom.

An important characteristic of the invention resides in the fact that the strainer plate is disposed at the forward extremity of the cutter head, the only projection beyond the strainer plate being the forward end portion of the cutter blades 12. The strainer plate, further, has the suction line in direct contact therewith, immediately in back of the same. Due to this arrangement, there is allowed the minimum of one inch between the bottom of the cut and the straining plate and suction line inlet, and this of course, is so small in area that no large object can move into the same. This important feature of the construction increases measurably the overall efficiency of the cutter head, so that the strainer plate is under less pressure from large objects, being in contact only with such large objects as may be directly encountered in the material during the making of the cut, and being under no pressure whatever from other objects adjacent the same which might tend to move into the space immediately forward of the strainer plate were the space between the bottom of the cut and the strainer unit greater than the minimum of one inch.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A cutter head for dredges comprising a hollow cylinder having one end open and having at the other end an end wall formed with concentric annular rows of perforations extending about the marginal portion of said end wall to provide a strainer plate, said cylinder having a side wall formed with a circumferential series of vertical ribs extending longitudinally of the cylinder from said one end wall thereof to provide cutter blades; a rotatable shaft extending axially of and within the cylinder and having a rigid connection to the strainer plate; a non-rotating suction line having an inlet end within the cylinder in engagement with the strainer plate, said line projecting out of the other end of the cylinder in laterally spaced relation to the shaft; and a stationary cover plate having a fixed connection to the suction line and covering the open end of the cylinder, said cover plate having a center opening and the shaft projecting exteriorly of the cylinder through said opening.

2. A cutter head for dredges comprising a hollow cylinder having one end open and having at the other end an end wall formed with concentric annular rows of perforations extending about the marginal portion of said end wall to provide a strainer plate, said cylinder having a side wall formed with a circumferential series of vertical ribs extending longitudinally of the cylinder from said one end wall thereof to provide cutter blades; a rotatable shaft extending axially of and within the cylinder and having a rigid connection to the strainer plate; a non-rotating suction line having an inlet end within the cylinder in engagement with the strainer plate, said line projecting out of the other end of the cylinder in laterally spaced relation to the shaft; a stationary cover plate having a fixed connection to the suction line and covering the open end of the cylinder, said cover plate having a center opening and the shaft projecting exteriorly of the cylinder through said opening; and a bearing mounted upon said suction line exteriorly of the cylinder to provide a journal for the projecting portion of the shaft.

3. A cutter head for dredges comprising a hollow, elongated cylinder having one end formed open, the cylinder at its other end including an end wall formed with concentric, annular rows of perforations extending about the marginal portion of said end wall, to provide a strainer plate, said cylinder having a side wall formed with a circumferential series of vertical ribs extending longitudinally of the cylinder from said end wall thereof to provide cutter blades; a rotatable shaft rigid with said strainer plate at the center of the strainer plate, the shaft extending axially of and within the cylinder and projecting beyond the open end of the cylinder, for rotating the cylinder and strainer plate responsive to rotatable movement of the shaft; an elongated suction line extending longitudinally of the cylinder in parallelism with the shaft, said suction line having its inlet end in contact with the strainer plate for passage of dredged materials through the perforations of the strainer plate into the suction line, the suction line extending in close proximity to the side wall of the cylinder; a backing plate in contact with and overlying substantially the full area of the strainer plate, said backing plate being rigid with the inlet of the suction line and being formed with a centrally disposed bearing in which the shaft is journalled, said backing plate being of imperforate formation so as to close all the perforations of the strainer plate except those in registration with the inlet of the suction line; a cover plate for the open end of the cylinder, said cover plate including a peripheral flange engaging the adjacent end of the cylinder side wall, the cover plate having a center opening through which the shaft projects and being integral at its margin with the suction line; and a bearing mounted upon the suction line exteriorly of the cylinder and coaxial with the bearing of the backing plate to provide a journal for the shaft outside the cylinder.

References Cited in the file of this patent
UNITED STATES PATENTS

| | | |
|---|---|---|
| 341,539 | Angell | May 11, 1886 |
| 1,155,370 | Randles | Oct. 5, 1915 |

FOREIGN PATENTS

| | | |
|---|---|---|
| 11,193 | Great Britain | of 1884 |